United States Patent
Bournas

(10) Patent No.: US 6,748,414 B1
(45) Date of Patent: Jun. 8, 2004

(54) METHOD AND APPARATUS FOR THE LOAD BALANCING OF NON-IDENTICAL SERVERS IN A NETWORK ENVIRONMENT

(75) Inventor: Redha M. Bournas, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,227

(22) Filed: Nov. 15, 1999

(51) Int. Cl.[7] ................................. G06F 9/00
(52) U.S. Cl. ................. 709/105; 709/201; 709/223; 709/224
(58) Field of Search ................. 709/224, 105, 709/200, 201, 203, 217, 218, 219, 223

(56) References Cited

U.S. PATENT DOCUMENTS

| | | | | |
|---|---|---|---|---|
| 5,053,950 A | * | 10/1991 | Naganuma et al. | 709/105 |
| 5,241,677 A | * | 8/1993 | Naganuma et al. | 709/105 |
| 5,539,883 A | * | 7/1996 | Allon et al. | 370/237 |
| 5,606,693 A | * | 2/1997 | Nilsen et al. | 707/10 |
| 5,745,694 A | * | 4/1998 | Egawa et al. | 709/104 |
| 5,774,660 A | * | 6/1998 | Brendel et al. | 709/100 |
| 5,774,668 A | * | 6/1998 | Choquier et al. | 370/480 |
| 5,819,045 A | * | 10/1998 | Raman et al. | 709/105 |
| 5,864,535 A | * | 1/1999 | Basilico | 370/231 |
| 5,867,706 A | * | 2/1999 | Martin et al. | 709/105 |
| 5,872,930 A | * | 2/1999 | Masters et al. | 370/228 |
| 5,915,095 A | * | 6/1999 | Miskowiec | 370/255 |
| 6,138,159 A | * | 10/2000 | Phaal | 709/201 |
| 6,141,759 A | * | 10/2000 | Braddy | 709/203 |
| 6,223,205 B1 | * | 4/2001 | Harchol-Balter et al. | 709/105 |
| 6,233,607 B1 | * | 5/2001 | Taylor et al. | 709/217 |
| 6,279,001 B1 | * | 8/2001 | DeBettencourt et al. | 707/10 |
| 6,314,463 B1 | * | 11/2001 | Abbott et al. | 709/224 |
| 6,317,786 B1 | * | 11/2001 | Yamane et al. | 709/224 |
| 6,317,808 B1 | * | 11/2001 | Berenshteyn | 710/39 |

OTHER PUBLICATIONS

Hunt et al, Network Dispatcher: a connection router for scalable Internet services, 1998, Computer Networks and ISBN Systems, vol. 30..*

* cited by examiner

Primary Examiner—Ario Etienne
Assistant Examiner—LaShonda Jacobs
(74) Attorney, Agent, or Firm—Gregory M. Doudnikoff; Carsten's Yee & Cahoon, LLP

(57) ABSTRACT

A method and apparatus in a distributed data processing system for handling requests. Processing of requests received at a server system is monitored, wherein the server system includes a plurality of servers. A work load is estimated at each of the plurality of servers. The request is forwarded to a server within the plurality of servers having an estimated smallest work load.

22 Claims, 5 Drawing Sheets server

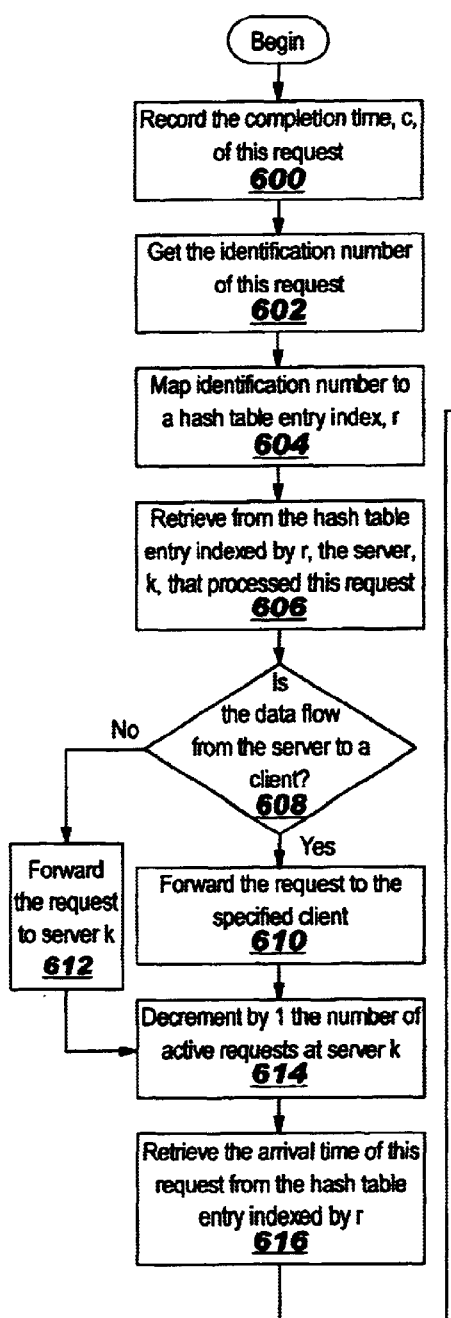
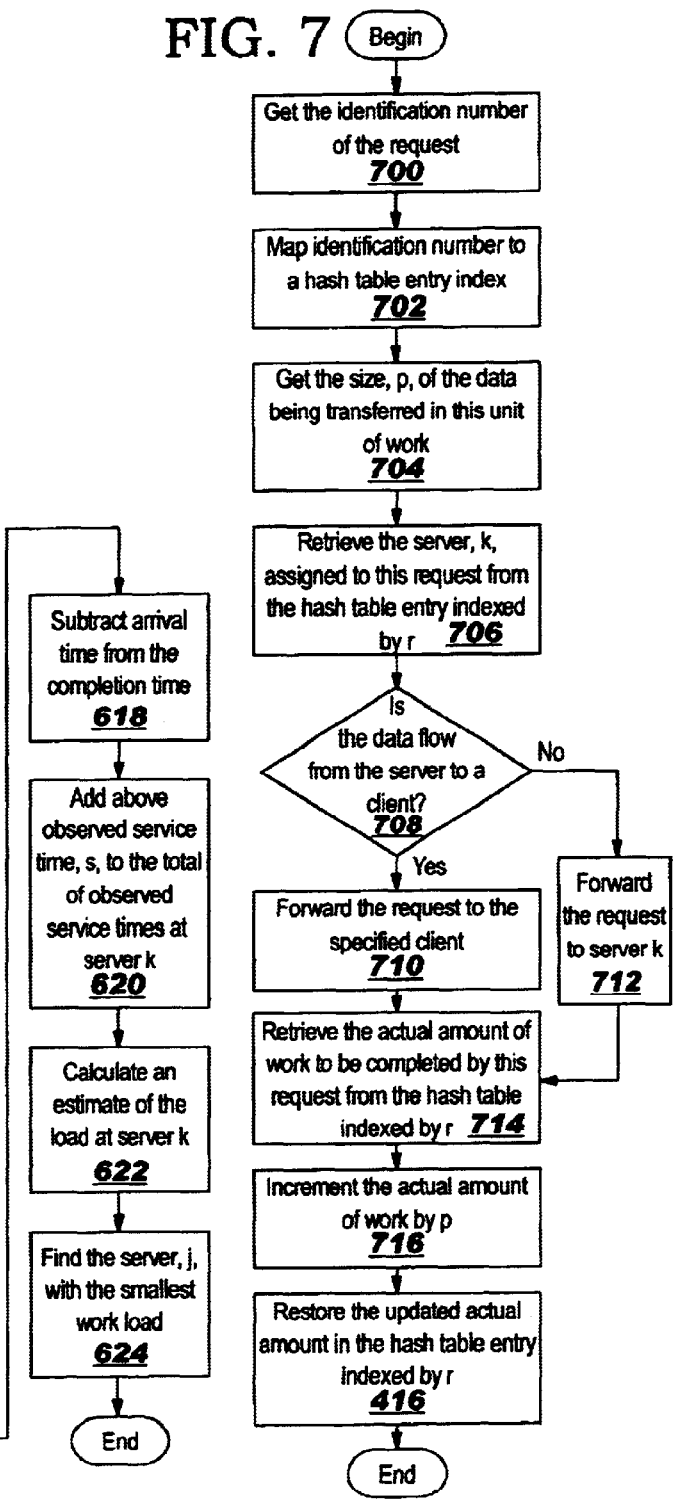

METHOD AND APPARATUS FOR THE LOAD BALANCING OF NON-IDENTICAL SERVERS IN A NETWORK ENVIRONMENT

BACKGROUND OF THE INVENTION

1. Technical Field

The present invention relates generally to an improved distributed data processing system and in particular to the method of handling requests in a distributed data processing system. Still more particularly, the present invention relates to a method and apparatus for load balancing the requests from clients in a distributed data processing system.

2. Description of Related Art

Over the last few years, a surge in the number of Internet users and server providers has occurred. The number of Internet users has been growing geometrically since the early 1900's. This growth calls for capacity planning, performance, and management studies to properly handle the Internet traffic with the ultimate goal being to speed up users' response time, or increase their file transfer throughout. Some particular file serving applications that have been receiving particular attention are the World Wide Web (WWW) and the File Transfer Protocol (FTP). One problem to be solved is how to serve the increasing number of users and their work load demands within acceptable users' performance criteria.

One solution is to make the server hardware run faster, but this is expensive. A cheaper solution is to provide a cluster of identical parallel servers to accommodate the large transaction rates of the requests generated by the users (the number of servers being dependent on these rates). The servers share the data and the network address; to the users, these servers appear as a single node. This solution, however, requires the assignment of each request to the right server. This arrangement means that new techniques to balance the load among the servers are needed. Special attention has been made to the case where the clients are only reading information from servers, such as for example, Web servers. The load balancing of the servers means that the servers should be as evenly loaded as possible at any given time. It is important to avoid assigning requests to a server that is busier than another one. This rule reduces unnecessary queuing time and thus will not increase the user's response time. It will also reduce congestion at the servers and thus avoid any resource allocation problems that may arise.

Mechanisms presently available for load balancing the servers include the following schemes: (1) round robin; (2) forward the request to the server with the least number of requests in its queue; (3) forward the request to the server with the fastest response time; and (4) use a server agent to determine the actual load on each server.

The knowledge of the load at each server at any decision point is an important element. Techniques (1) and (2) above do not take into account such information, while techniques (3) and (4) do. The latter methods, however, require communication with the servers to obtain the load statistics. This requirement requires specific software to run on the servers and the front-end processor (the load balancing node). Techniques (1) and (2) usually do not work well because the statistical distributions of the work loads generated by the clients are not identical. Using these methods may cause one server to be busier than another. For example, consider the case of two clients and two servers. One client is generating a heavy work load, while the other one is generating a light one. If it so happens that the arrival pattern to the front-end processor is such that the odd numbered requests are from the first client and the even numbered requests are from the second one, then it will be the case that one server will be a lot busier than the other one.

Therefore, it would be advantageous to have an improved method and apparatus for load balancing parallel servers in a distributed data processing system.

SUMMARY OF THE INVENTION

The present invention provides a method and apparatus in a distributed data processing system for handling requests. Processing of requests received at a server system is monitored, wherein the server system includes a plurality of servers. A work load is estimated at each of the plurality of servers. The request is forwarded to a server within the plurality of servers having an estimated smallest work load.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart of a process to handle a session closure depicted in accordance with the preferred embodiment of the present invention;

FIG. 7 is a flowchart of a process for handling a data transfer using servers with variable service rates depicted in accordance with the preferred embodiment of the present invention.

DETAILED DESCRIPTION OF THE PREFERRED EMBODIMENT

Figure 1:
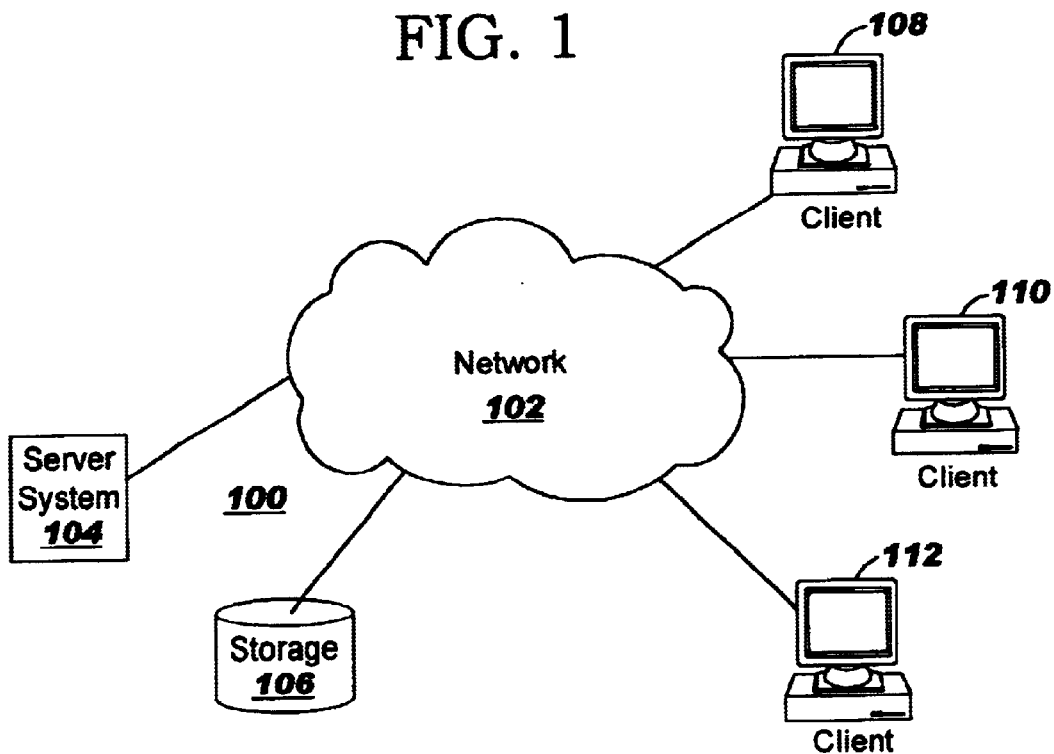
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communication links between various devices and computers connected together within distributed data processing system 100. Network 102 may include permanent connections, such as wire or fiber optic cables, or temporary connections made through telephone connections.

In the depicted example, a server system 104 is connected to network 102 along with storage unit 106. Server system 104 typically will contain two or more servers and is also referred to as a "cluster." In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server system 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems that route data and messages. Of course, distributed data processing system 100 also may be implemented as a number of different types of networks, such as for example, an intranet, a local area network (LAN), or a wide area network (WAN). FIG. 1 is intended as an example and not as an architectural limitation for the present invention.

Figure 2:
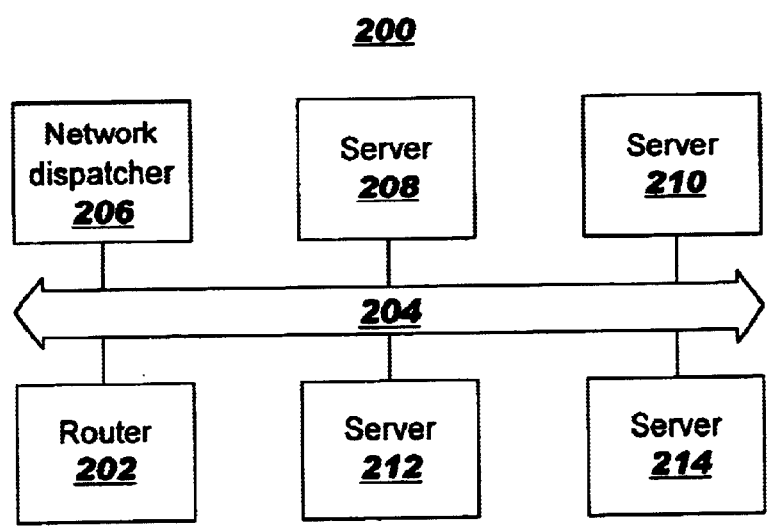
FIG. 2 is a server system depicted in accordance with a preferred embodiment of the present invention.

Turning now to FIG. 2, a server system is depicted in accordance with a preferred embodiment of the present invention. Server system 200 may be implemented as server system 104 in FIG. 1.

Server system 200 in this example includes a router 202, which receives requests from clients. Router 202 is connected to a bus 204. This bus also provides an interconnection for network dispatcher 206. Network dispatcher 206 is also referred to as a "front-end processor". Also within server system 200 are servers 208, 210, 212, and 214. Network dispatcher 206 will receive requests from router 202 and send the requests to a server within server system 200 for processing. Responses to the requests will be routed from the server processing the request back to the client through router 202 in these examples. In accordance with a preferred embodiment of the present invention, a client making a request to a server and server system 200 only sees a single server. Servers 208, 210, 212, and 214 share data received within server system 200, as well as the network address. For example, a request to server system 200 is made to a particular network address, such as an Internet Protocol (IP) address. Router 202 will receive the request and route this request to network dispatcher 206. In turn, network dispatcher 206 will send the request to the appropriate server for processing. This routing of the request to an appropriate server for processing is transparent and is not visible to a client making a request.

The illustration of server system 200 in FIG. 2 is not meant to imply architectural limitations to the present invention. For example, only four servers are illustrated in the system. Other numbers of servers may be used to implement a server system. Additionally, bus 204 may take various forms. Bus 204 also may take the form of a local area network or some other shared resource mechanism to transfer data within server system 200.

Figure 3:
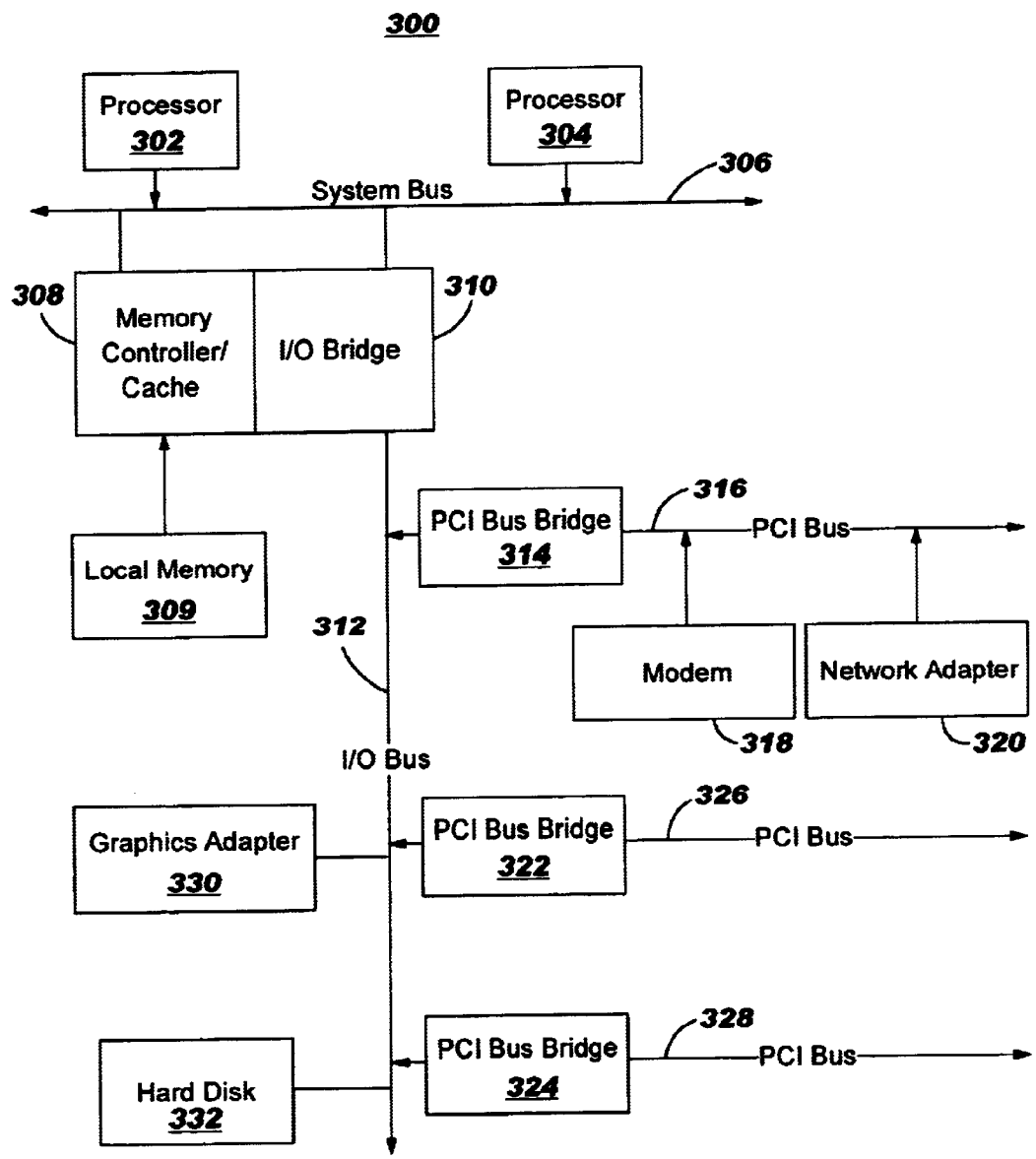
FIG. 3 is a block diagram depicting a data processing system that may be implemented as a server or network dispatcher in accordance with a preferred embodiment of the present invention.

Referring to FIG. 3, a block diagram depicting a data processing system that may be implemented as a server or network dispatcher in accordance with a preferred embodiment of the present invention. Data processing system 300 may be implemented as a server, such as servers 208, 210, 212, or 214 in FIG. 2. Further, a network dispatcher, such as network dispatcher 206 in FIG. 2, may be implemented using data processing system 300.

Data processing system 300 may be a symmetric multi-processor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI bus 316. Typical PCI bus implementations will support four PCI expansion slots or add-in connectors. Communications links to network computers 108–112 in FIG. 1 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM RISC/System 6000 system, a product of International Business Machines Corporation in Armonk, N.Y., running the Advanced Interactive Executive (AIX) operating system.

The present invention provides a method, apparatus, and computer implemented instructions for balancing the load on a set of servers processing requests generated by end users. In particular, the mechanism of the present invention is especially useful for use with server systems in which individual server within the system have different service rates. In other words, the mechanism of the present invention is useful in systems in which a server processes requests at different rates from other servers. The mechanism of the present invention monitors processing of requests received at a server system. The work load is estimated for each of the servers within the server system. Requests are forwarded to a server having the smallest work load.

Figure 4:
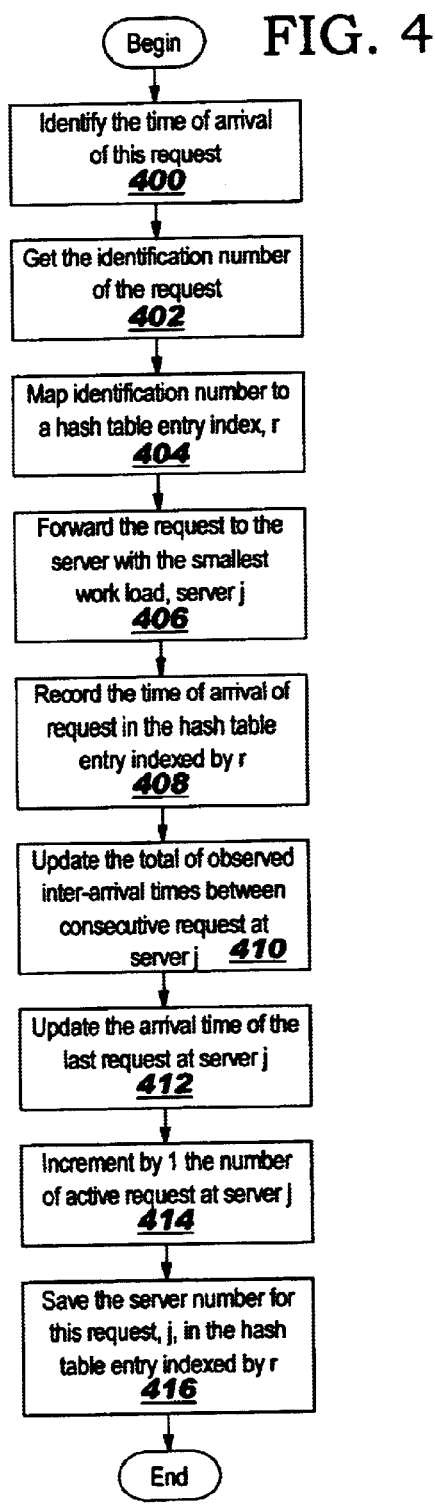
FIG. 4 is a flowchart of a process to handle a request to establish a session depicted in accordance with the preferred embodiment of the present invention.
Figure 5:
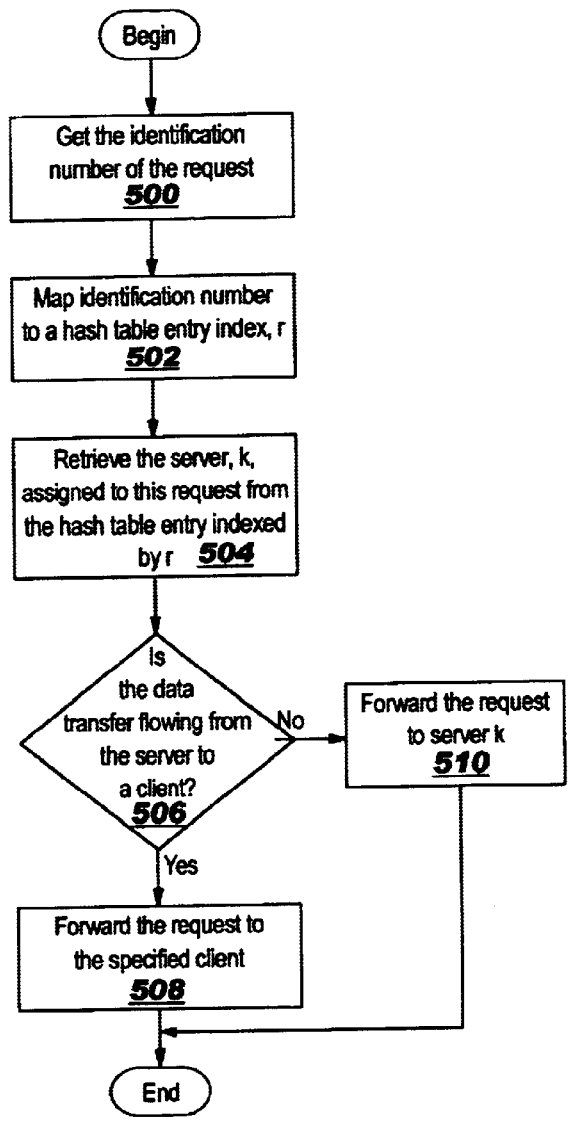
FIG. 5 is a flowchart of a process to handle data transfer depicted in accordance with the preferred embodiment of the present invention.
Figure 8:
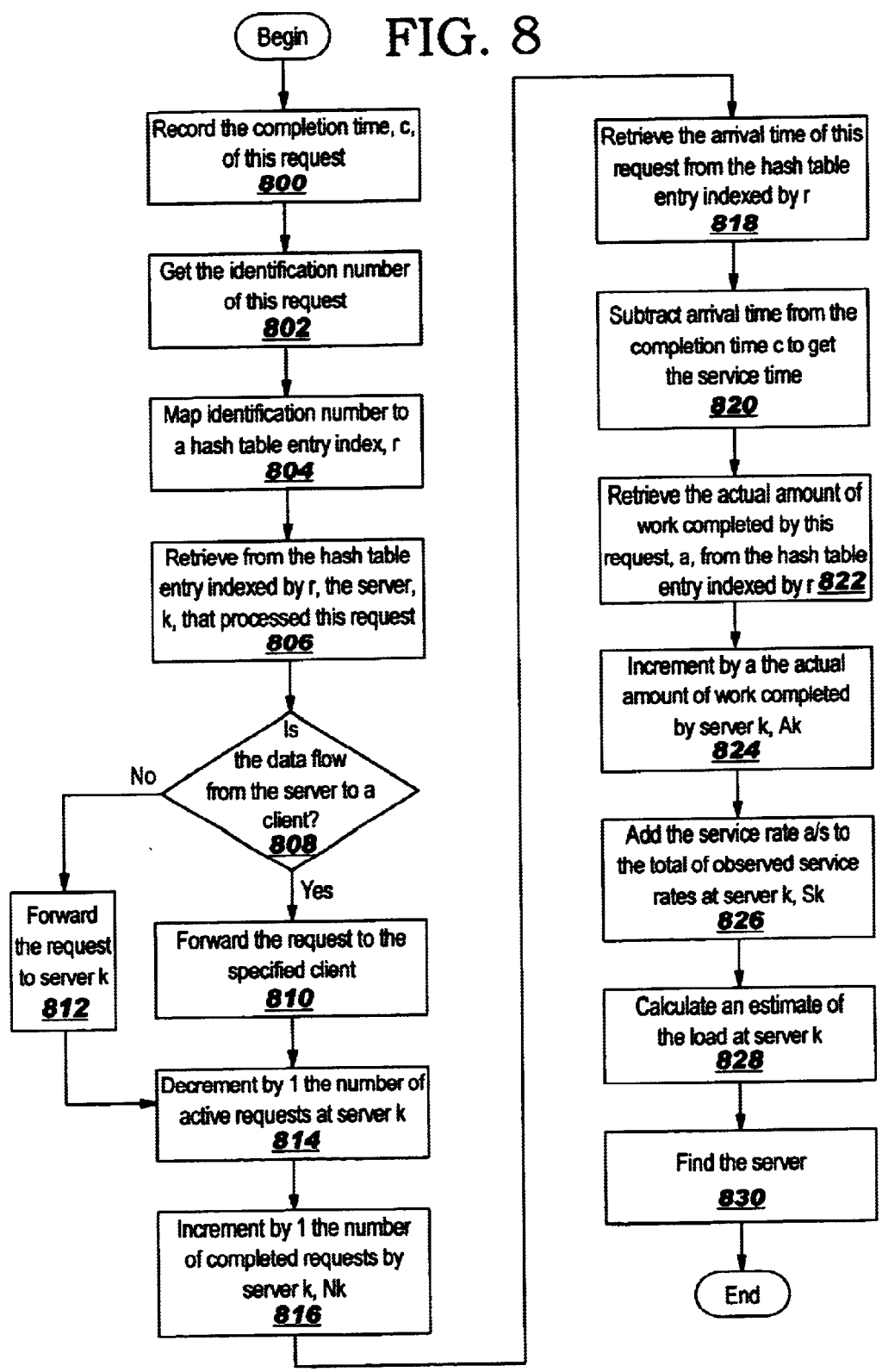
FIG. 8 is a flowchart of a process to handle a session closure using servers with variable service rates depicted in accordance with the preferred embodiment of the present invention.

With reference now to FIGS. 4–8, flowcharts illustrating processes to assign a new request to a right server are depicted. FIGS. 4–6 are directed towards load balancing of non-identical servers with a fixed service rate. FIGS. 7 and 8 are directed towards load balancing of non-identical servers with a variable service rate. Each of these figures deals with one of the three phases of a data transfer session: (1) session establishment; (2) data transfer; and (3) session closure. A set of global variables is used for each of these phases. The variables used include an identification number for each request. This identification number may be generated in a number of ways. For example, the identification number may be generated as a function of the sender address and the receiver network address. The number of active requests at each server also is tracked. Active requests are those requests not yet completed. The variables also include a number of completed requests for each server. An estimate of the average work load size and an estimate of an average amount of work to be done by an arriving request also is tracked in variables. The variables also include an estimate of the amount of work queued at each server as well as the identification of the server with the least amount of work in its queue. The actual amount of work completed for each request and the actual amount of work completed by all servers also are stored in variables used by these processes. Work load is the proportion of time a server is busy processing requests. No units are used for work load, and work load is represented by a number that is inclusive between zero and one.

With reference now to FIG. 4, a flowchart of a process to handle a request to establish a session is depicted in accordance with the preferred embodiment of the present invention. FIG. 4 illustrates the first phase of a data transfer session in which the session is established.

The process begins by identifying the time of arrival of this request (step 400). The identification number of the request is obtained (step 402), and the identification number is mapped to a hash table entry index, r (step 404). The request is forwarded to the server with the smallest work load, which is identified as server j in this example (step 406).

Next, the time of arrival of the request is recorded in the hash table entry indexed by r (step 408). The total observed inter-arrival time between consecutive requests at server j is updated (step 410). The total observed inter-arrival time may be updated by calculating the inter-arrival time, say I, from the last request by subtracting the arrival time of the last request forwarded to server j from the arrival time of this request. Then, the inter-arrival time, I, for the new request is added to the total of observed inter-arrival times. This result is saved in the hash table entry indexed by r.

The arrival time of the last request at server j is updated (step 412). The number of active requests at server j is incremented by 1 (step 414). The server number for this request, j, is saved in the hash table entry indexed by r (step 416) with the process terminating thereafter.

Turning next to FIG. 5, a flowchart of a process to handle data transfer is depicted in accordance with the preferred embodiment of the present invention. FIG. 5 illustrates the second phase in a data transfer session in which the data transfer actually occurs.

The process begins by obtaining the identification number of the request (step 500). The identification number is mapped to a hash table entry index, r (step 502). The server, k, assigned to this request is retrieved from the hash table entry indexed by r (step 504). A determination is made as to whether the data transfer is flowing from the server to a client (step 506). If the data transfer is flowing from the server to a client, the request is forwarded to the specified client (step 508). Otherwise, the request is forwarded to server k (step 510) with the process terminating thereafter.

With reference now to FIG. 6, a flowchart of a process to handle a session closure is depicted in accordance with the preferred embodiment of the present invention. FIG. 6 illustrates a third phase in a data transfer session in which the session is closed.

The process begins by recording the completion time, c, of this request (step 600). The identification number of the request is obtained (step 602), and this identification number is mapped to a hash table entry index, r (step 604). The server, k, is retrieved from the hash table entry indexed by r (step 606). The server is the one that processed this request.

A determination is made as to whether the data flow is from the server to a client (step 608). If the data flow is from a server to the client, the request is forwarded to the specified client (step 610). Otherwise, the request is forwarded to server k (step 612). In either case, the number of active requests at server k is decremented by 1 (step 614). The arrival time of this request is retrieved from the hash table entry indexed by r (step 616). This arrival time is subtracted from the completion time c (step 618). The result of step 618 is the service time, say s. This observed service time, s, is added to the total of observed service times at server k (step 620).

An estimate of the load at server k is calculated by dividing the total of observed service times at server k by the total of observed inter-arrival times at server k (step 622). The server, j, with the smallest work load is identified (step 624) with the process terminating thereafter. If two or more servers have the same work load, choose the server with the smallest number of active requests.

In the case of servers with variable service rates, additional parameters are taken into account. In the session establishment phase, the process is identical to that illustrated for servers with fixed service rates in FIG. 4. The description of FIGS. 7 and 8 below illustrate the data transfer and session closure processes for servers with variable service rates.

Turning next to FIG. 7, a flowchart of a process for handling a data transfer using servers with variable service rates is depicted in accordance with the preferred embodiment of the present invention.

The process begins by obtaining the identification number of the request (step 700). The identification number of the request is mapped to a hash table entry index, r (step 702). From this entry, the size, p, of the data being transferred in this unit of work is obtained (step 704). The server, k, assigned to this request is obtained from the hash table entry indexed by r (step 706). A determination is made as to whether the data transfer is flowing from the server to a client (step 708). If the data flow is from a server to a client, the request is forwarded to the specified client (step 710). Otherwise, the request is forwarded to server k (step 712). In either event, the actual amount of work to be completed by this request is retrieved from the hash table indexed by r (step 714). The actual amount of work to be completed by this request is incremented by p (step 716) and the actual amount of work to be completed is restored in the hash table entry indexed by r (step 718) with the process terminating thereafter.

With reference now to FIG. 8, a flowchart of a process to handle a session closure using servers with variable service rates is depicted in accordance with the preferred embodiment of the present invention.

The process begins by recording the completion time, c, of this request (step 800). The identification number of the request is obtained (step 802), and this identification number is mapped to a hash table entry index, r (step 804). The server, k, that processed this request is retrieved from the hash table entry indexed by r (step 806). A determination is made as to whether the data flow is from a server to a client (step 808). If the data flow is from a server to a client, the request is forwarded to the specified client (step 810). Otherwise, the request is forwarded to server k (step 812). In either event, the number of active requests at server k is decremented by 1 (step 814). The number of completed requests by server k, Nk, is incremented by 1 (step 816). Next, the arrival time of this request is retrieved from the hash table entry indexed by r (step 818). This arrival time is subtracted from the completion time c (step 820). The result is the service time, s. The actual amount of work completed by this request, a, is retrieved from the hash table entry indexed by r (step 822). The actual amount of work completed by server k, Ak, is incremented by a, which represents the actual amount of work completed by server k (step 824). The service rate is added to the total of observed service rates at server k, Sk (step 826). The service rate is determined by dividing a by s in this example. An estimate of the load at server k is calculated (step 828). This estimate is calculated using the following equation:

$$\frac{Nk}{Ik} \cdot \frac{Ak}{Sk}$$

Thereafter, the server, j, with the smallest work load is then identified (step 830) with the process terminating thereafter. If two or more servers have the same work load, choose the server with the smallest number of active requests.

Thus, the present invention provides an improved mechanism for load balancing workloads for a server system in which different servers may have different service rates. The mechanism involves estimating a load at each server and forwarding a new request to the server with the smallest load. The process of the present invention may be applied to both servers with a fixed service rate and a variable service rate in the manner described above. With a variable service rate, an additional identification of the average service rate of each server is calculated each time a request is completed. In this manner, a new arriving request for a server may be assigned to the right server, which is the one with the smallest load. This mechanism provides a more accurate load balancing system for servers when the goal is to balance loads between servers as evenly as possible.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a distributed data processing system for handling requests, the method comprising the computer implemented steps of:

monitoring processing of requests received at a server system, wherein the server system includes a plurality of servers;

determining an estimated work load for each of the plurality of servers based on a service rate for each of the plurality of servers, wherein the plurality of servers have different service rates, wherein the different service rates for the plurality of servers are fixed; and forwarding the request to a server within the plurality of servers having a smallest estimated work load, wherein the step of determining an estimated work load comprises dividing a total of service times for a server by a total of observed inter-arrival times for the server, wherein an inter-arrival time is a time period between an arrival of a request sent to the server and an arrival time of a previous request sent to the server.

2. The method of claim 1, wherein the step of monitoring processing of requests at the server system includes monitoring arrival time of a request and associating the arrival time with a server within the plurality of servers assigned to process the request.

3. The method of claim 1, wherein the server system includes a network dispatcher and wherein the steps of monitoring, determining, and forwarding are located in the network dispatcher.

4. The method of claim 1, wherein the plurality of servers are a plurality of web servers.

5. The method of claim 1, wherein the distributed data processing system is an Internet.

6. The method of claim 1, wherein the distributed data processing system is an intranet.

7. The method of claim 1, further comprising:

forwarding means, responsive to a subset of servers within the plurality of servers having a same estimated work load, for forwarding the request to a server within the subset having a smallest number of active requests.

8. A method in a distributed data processing system for handling requests, the method comprising the computer implemented steps of:

monitoring processing of requests received at a server system, wherein the server system includes a plurality of servers;

determining an estimated work load for each of the plurality of servers based on a service rate for each of the plurality of servers, wherein the plurality of servers have different service rates, wherein the different service rates are variable; and forwarding the request to a server within the plurality of servers having a smallest estimated work load, wherein the step of determining an estimated work load includes using an equation:

$$\frac{(N) \cdot (A)}{(I) \cdot (S)}$$

wherein N is a number of requests completed by the server, A is an actual amount of work completed by the server, I is a total of observed inter-arrival times for the server, in which an inter-arrival time is a time period between an arrival of a request sent to the server and an arrival time of a previous request sent to the server, S is a total observed service rate for the server.

9. A server system comprising:
a data transfer mechanism;
a plurality of servers coupled to the data transfer system; and
a network dispatcher, wherein the network dispatcher monitors processing of each request received at the server system, calculates an estimated work load for each of the plurality of servers based on a service rate for each of the plurality of servers, and forwards the request to a server within the plurality of servers having a lowest estimated amount of work to process,
wherein the plurality of servers have different service rates, wherein the different service rates are fixed, and wherein the service processor calculates an estimated work load for a server within the plurality of servers by dividing a total of service times for the server by a total of observed inter-arrival times for the server, wherein an inter-arrival time is a time period between an arrival of a request sent to the server and an arrival time of a previous request sent to the server.

10. The server system of claim 9, wherein the network dispatcher monitors arrival time of a request and associating the arrival time with a server within the plurality of servers assigned to process the request.

11. The server system of claim 9, wherein the plurality of servers is a plurality of web servers.

12. A server system comprising:
a data transfer mechanism;
a plurality of servers coupled to the data transfer system; and
a network dispatcher, wherein the network dispatcher monitors processing of each request received at the server system, calculates an estimated work load for each of the plurality of servers based on a service rate for each of the plurality of servers, and forwards the request to a server within the plurality of servers having a lowest estimated amount of work to process,
wherein the plurality of servers have different service rates, wherein the different service rates for the plurality of servers are variable, and wherein the service processor calculates an estimated work load for a server within the plurality of servers follows:

$$\frac{(N)\cdot(A)}{(I)\cdot(S)}$$

wherein N is a number of requests completed by the server, A is an actual amount of work completed by the server, I is a total of observed inter-arrival times for the server, in which an inter-arrival time is a time period between an arrival of a request sent to the server and an arrival time of a previous request sent to the server, S is a total observed service rate for the server.

13. A distributed data processing system for handling requests, the distributed data processing system comprising:
monitoring means for monitoring processing of requests received at a server system, wherein the server system includes a plurality of servers;
estimating means for determining an estimated work load for each of the plurality of servers based on a service rate for each of the plurality of servers; and
forwarding means for forwarding the request to a server within the plurality of servers having a smallest estimated work load,
wherein the plurality of servers have different service rates, wherein the different service rates for the plurality of servers are fixed, and wherein the estimating means comprises:
dividing means for dividing a total of service times for a server by a total of observed inter-arrival times for the server, wherein an inter-arrival time is a time period between an arrival of a request sent to the server and an arrival time of a previous request sent to the server.

14. The distributed data processing system of claim 13, wherein the monitoring means for monitoring processing of requests at the server system includes monitoring arrival time of a request and associating the arrival time with a server within the plurality of servers assigned to process the request.

15. The distributed data processing system of claim 13, wherein the server system includes a network dispatcher and wherein the monitoring means, estimating means, and forwarding means are located in the network dispatcher.

16. The distributed data processing system of claim 13, wherein the plurality of servers are a plurality of web servers.

17. The distributed data processing system of claim 13, wherein the distributed data processing system is an Internet.

18. The distributed data processing system of claim 13, wherein the distributed data processing system is an intranet.

19. The distributed data processing system of claim 13, further comprising:
forwarding means, responsive to a subset of servers within the plurality of servers having a same estimated work load, for forwarding the request to a server within the subset having a smallest number of active requests.

20. A distributed data processing system for handling requests, the distributed data processing system comprising:
monitoring means for monitoring processing of requests received at a server system, wherein the server system includes a plurality of servers;
estimating means for determining an estimated work load for each of the plurality of servers based on a service rate for each of the plurality of servers; and
forwarding means for forwarding the request to a server within the plurality of servers having a smallest estimated work load,
wherein the plurality of servers have different service rates, wherein the different service rates are variable, and wherein the estimating means includes using an equation:

$$\frac{(N)\cdot(A)}{(I)\cdot(S)}$$

wherein N is a number of requests completed by the server, A is an actual amount of work completed by the server, I is a total of observed inter-arrival times for the server, in which an inter-arrival time is a time period between an arrival of a request sent to the server and an arrival time of a previous request sent to the server, S is a total observed service rate for the server.

21. A computer program product in a computer readable medium for handling requests, the computer program product comprising:
first instructions for monitoring processing of requests received at a server system, wherein the server system includes a plurality of servers;
second instructions for determining an estimated work load at each of the plurality of servers based on a service rate for each of the plurality of servers, wherein the plurality of servers have different service rates, wherein the different service rates for the plurality of servers are fixed; and third instructions for forwarding the request to a server within the plurality of servers having a smallest estimated work load, wherein the instructions for determining an estimated work load comprises instructions for dividing a total of service times for a server by a total of observed inter-arrival times for the server, wherein an inter-arrival time is a time period between an arrival of a request sent to the server and an arrival time of a previous request sent to the server.

22. A computer program product in a computer readable medium for handling requests, the computer program product comprising:

first instructions for monitoring processing of requests received at a server system, wherein the server system includes a plurality of servers;

second instructions for determining an estimated work load for each of the plurality of servers based on a service rate for each of the plurality of servers, wherein the plurality of servers have different service rates, wherein the different service rates are variable; and third instructions for forwarding the request to a server within the plurality of servers having a smallest estimated work load, wherein the instructions for determining an estimated work load includes instructions for using an equation:

$$\frac{(N) \cdot (A)}{(I) \cdot (S)}$$

wherein N is a number of requests completed by the server, A is an actual amount of work completed by the server, I is a total of observed inter-arrival times for the server, in which an inter-arrival time is a time period between an arrival of a request sent to the server and an arrival time of a previous request sent to the server, S is a total observed service rate for the server.

* * * * *